US010063129B2

(12) United States Patent
Mao et al.

(10) Patent No.: US 10,063,129 B2
(45) Date of Patent: Aug. 28, 2018

(54) FLAT LINEAR VIBRATION MOTOR

(71) Applicants: Lubin Mao, Shenzhen (CN); Shun Guo, Shenzhen (CN); Hongxing Wang, Shenzhen (CN)

(72) Inventors: Lubin Mao, Shenzhen (CN); Shun Guo, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 336 days.

(21) Appl. No.: 15/011,490

(22) Filed: Jan. 30, 2016

(65) Prior Publication Data
US 2016/0226363 A1 Aug. 4, 2016

(30) Foreign Application Priority Data

Feb. 2, 2015 (CN) .......................... 2015 1 0053642

(51) Int. Cl.
*H02K 33/00* (2006.01)
*H02K 33/16* (2006.01)

(52) U.S. Cl.
CPC .................... *H02K 33/16* (2013.01)

(58) Field of Classification Search
CPC .......................................... H02K 33/00–33/18
USPC ..................................................... 310/12–14
See application file for complete search history.

(56) References Cited

U.S. PATENT DOCUMENTS

| 5,134,325 | A | * | 7/1992 | Togawa | G11B 19/2009 310/12.16 |
| 5,434,549 | A | * | 7/1995 | Hirabayashi | H02K 33/00 335/229 |
| 5,896,076 | A | * | 4/1999 | van Namen | H01F 7/1615 335/222 |
| 6,239,517 | B1 | * | 5/2001 | Nakamura | B41J 25/006 101/93.04 |
| 6,853,103 | B2 | * | 2/2005 | Moriyasu | H02K 33/18 310/15 |
| 7,276,821 | B2 | * | 10/2007 | Miyamoto | H02K 41/03 310/12.19 |

(Continued)

*Primary Examiner* — Alexander Talpalatski
(74) *Attorney, Agent, or Firm* — Na Xu; IPro, PLLC

(57) ABSTRACT

A flat linear vibration motor is disclosed. The flat linear vibration motor includes a housing having an accommodation space, a first magnet received in the accommodation space and fixed in the housing, a vibrator unit suspended in the housing, the vibrator unit including a third magnet, a driving magnet, and a fourth magnet, the third magnet being such configured that a magnetic pole thereof is similar to an adjacent magnetic pole of the first magnet, a second magnet fixed in the housing, the first magnet, the vibrator unit and the second magnet arranged one by one along a vibration direction of the vibrator unit; the second magnet being such configured that a magnetic pole thereof is similar to an adjacent magnetic pole of the fourth magnet, a guiding member provided for enabling the vibrator unit being suspended within the housing, and guiding the vibrator unit moving along the vibration direction, the guiding member having an inner magnet fixed on the vibrator unit and an outer magnet surrounding the inner magnet, separated from the inner magnet and attached on the housing, a magnetic pole of the inner magnet is similar to an adjacent magnetic pole of the outer magnet, and a driving coil received in the accommodation space and opposed to the driving magnet.

8 Claims, 3 Drawing Sheets

(56) References Cited

U.S. PATENT DOCUMENTS

| | | | | |
|---|---|---|---|---|
| 7,449,803 B2* | 11/2008 | Sahyoun | H02K 33/16 | 310/14 |
| 7,745,963 B2* | 6/2010 | Jenny | H02K 41/02 | 310/12.01 |
| 7,768,160 B1* | 8/2010 | Sahyoun | H02K 33/16 | 310/14 |
| 7,859,144 B1* | 12/2010 | Sahyoun | H02K 33/16 | 310/14 |
| 8,283,834 B2* | 10/2012 | Matsubara | H02N 1/08 | 310/12.01 |
| 8,569,916 B2* | 10/2013 | Sugita | H02K 41/031 | 310/12.15 |
| 8,624,450 B2* | 1/2014 | Dong | H02K 33/16 | 310/15 |
| 8,643,228 B2* | 2/2014 | Vogel | H02K 41/031 | 310/12.24 |
| 8,682,396 B2* | 3/2014 | Yang | B06B 1/045 | 310/12.04 |
| 8,878,401 B2* | 11/2014 | Lee | H02K 33/16 | 310/15 |
| 9,325,230 B2* | 4/2016 | Yamada | H02K 33/16 | |
| 9,467,035 B2* | 10/2016 | Endo | B06B 1/045 | |
| 2002/0018195 A1* | 2/2002 | Iwamoto | G03F 7/70691 | 355/72 |
| 2004/0090295 A1* | 5/2004 | Yajima | F16F 15/03 | 335/229 |
| 2011/0018364 A1* | 1/2011 | Kim | H02K 33/18 | 310/17 |
| 2013/0076178 A1* | 3/2013 | Kuroda | H02K 33/00 | 310/81 |
| 2014/0265650 A1* | 9/2014 | Jeon | H02K 33/16 | 310/25 |
| 2015/0188399 A1* | 7/2015 | Fukasawa | H01L 21/67709 | 310/12.11 |

* cited by examiner

FLAT LINEAR VIBRATION MOTOR

FIELD OF THE INVENTION

The present invention generally relates to the art of vibrators and, more particularly, to a flat linear vibration motor for generating tactile sensation.

DESCRIPTION OF RELATED ART

Consumer products, such as mobile phones and portable multi-media players, generally include vibrators for generating tactile feedback. For example, a mobile phone has a motor for generating vibration while a call is called in, and a portable multi-media player has a touch screen having motors for getting tactile feedback.

A motor has a moving unit moving along a linear direction is called flat linear vibration motor. A typical flat linear vibration motor, widely used in consumer products, comprises a housing, a pair of elastic members connected to the housing, a vibrating unit suspended in the housing by the elastic members, and a coil positioned below the vibrating unit.

However, for fixing the vibrating unit on the housing firmly, it is difficult to reduce the height of the elastic members. Thus, the structures of the elastic members increase the height of the liner motor. And, the anti-fatigue performance of the elastic members is undesirable and the elastic members suffer from a non-sufficient lifetime.

So, it is necessary to provide a new motor for solving the problem mentioned above.

DETAILED DESCRIPTION OF THE EXEMPLARY EMBODIMENTS

Reference will now be made to describe exemplary embodiments of the present invention in detail.

Figure 1:
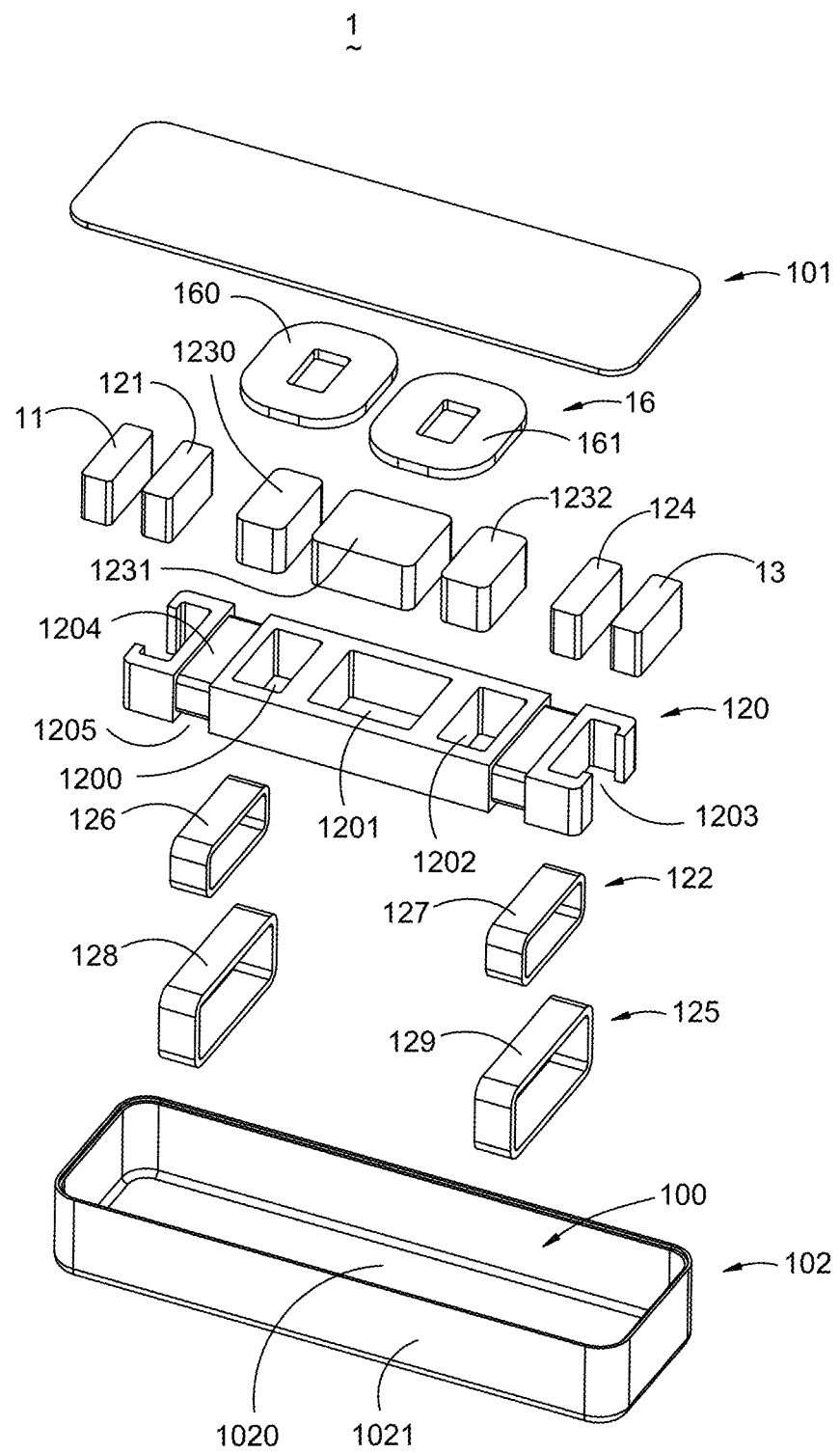
FIG. 1 is an exploded view of a flat linear vibration motor according to a first exemplary embodiment of the present invention.
Figure 2:
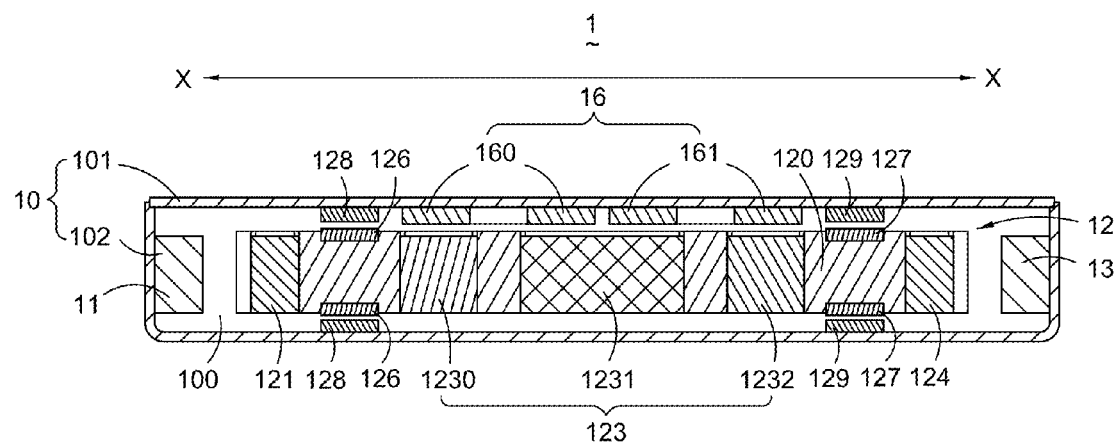
FIG. 2 is an enlarged cross-sectional view of the flat linear vibration motor.
Figure 3:
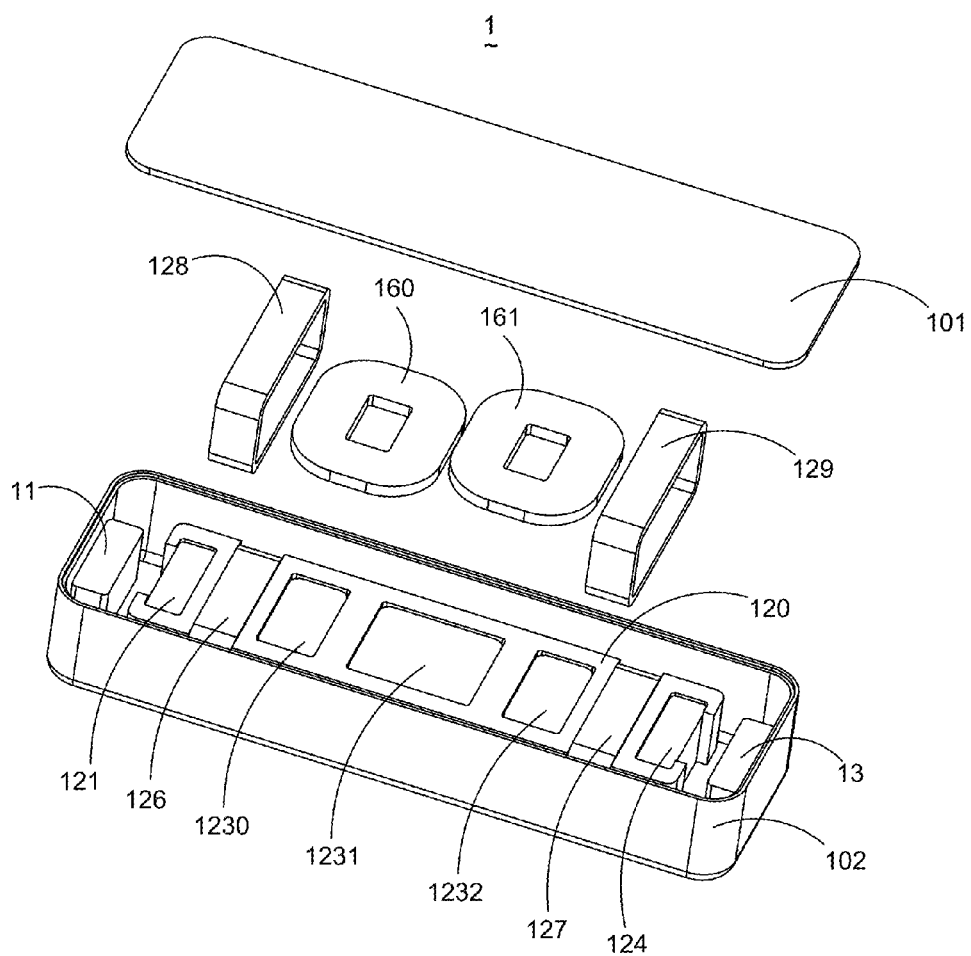
FIG. 3 is an isometric assembled of the flat linear vibration motor, an upper shell, an outer magnet and a coil thereof being partially removed away.
Figure 4:
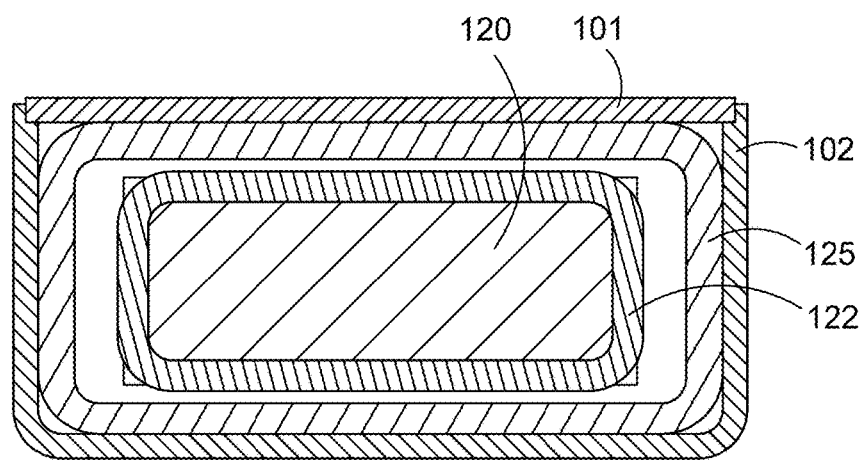
FIG. 4 is an enlarged cross-sectional view of the flat linear vibration motor, but from another aspect.

A flat linear vibration motor is mounted on a printed circuit board for generating tactile vibration along a vibrating direction. Referring to FIGS. 1 to 3, a flat linear vibration motor 1 in accordance with a first exemplary of the present invention comprises a long-strip housing 10 forming an accommodation space 100, a first magnet 11 fixed on the housing 10, a vibrator unit 12 suspended within the housing 10, a second magnet 13 fixed on the housing 10, and a driving coil 16 attached on the housing and opposite to the vibrator unit 12 for driving the vibration unit 12 to make reciprocating movement along a vibration direction X-X of the vibrator unit 12. The first magnet 11, the vibrator unit 12, and the second magnet 13 are arranged in sequence along the vibration direction X-X of the vibrator unit 12. The flat linear vibration motor 1 further includes at least one guiding member arranged between the vibrator unit 12 and the housing 10, enabling the vibrator unit 12 being suspended within the housing 10 for enabling guiding the vibrator unit 12 moving along the vibration direction X-X.

The housing 10 includes an upper shell 101 and a lower shell 102 cooperating with the upper shell 101 to form the accommodation space 100. The lower shell 102 includes a bottom wall 1020 and a side wall 1021 extending from the bottom wall 1020. The first magnet 11 and the second magnet 13 are fixed respectively in the side wall 1021 of the lower shell 102 and disposed in an inner side face of the side wall 1021. The upper shell 101 can be plate-shaped or the same shape as that of following lower shell 102. Various shapes can be set according to concrete need.

The vibrator unit 12 includes a long-strip weight 120, a third magnet 121, a driving magnet 122 and a fourth magnet 123 fixed in the weight 120. The third magnet 121 and the first magnet 11 are such configured that adjacent ends of the two magnets are spaced apart and have the same magnetic poles. The fourth magnet 123 and the second magnet 13 are such configured that adjacent ends of the two magnets are spaced apart and have the same magnetic poles. By virtue of the repulsive force generated by the first magnet 11, and the third magnet 121, and by the second magnet 13 and the fourth magnet 123, restoring force is generated for restricting the displacement of the vibrator unit 12 in the vibration direction X-X and for providing restoring force for the vibrator unit 12.

The guiding member comprises an inner magnet 122 fixed on the vibrator unit 12 and an outer magnet 125 surrounding the inner magnet 122 and separated from the inner magnet 122. An inner side of the inner magnet 122 surrounding a periphery of the vibrator unit 12 and an outer side of the outer magnet 125 fixed on an inner side face of the housing 10. In the present invention, the inner magnet 122 comprises a first inner magnet 126 and a second inner magnet 127. The driving magnet 123 is positioned between the first and second inner magnets 126, 127 and separated from the first and second inner magnets 126, 127. The outer magnet 125 comprises a first outer magnet 128 surrounding the first inner magnet 126 and a second outer magnet 129 surrounding the second inner magnet 127. The first inner magnet 126 is such configured that a magnetic pole thereof is similar to an adjacent magnetic pole of the first outer magnet 128. The second inner magnet 127 is such configured that a magnetic pole thereof is similar to an adjacent magnetic pole of the second outer magnet 129.

The first and second inner magnets 126, 127 are ring magnets, respectively. The first and second outer magnets 128, 129 match the shape of the first and second inner magnets 126, 127, respectively. Optionally, radial magnetization are adopted for the first and second inner magnets 126, 127 and radial magnetization are also adopted for the first and second outer magnets 128, 129. By utilizing the repelling force generated between the first inner magnet 126 and the first outer magnet 128 and the repelling force generated between the second inner magnet 127 and the second outer magnet 129, the first and the second outer magnets 128, 129 can limit the displacement of the vibrator unit 12 on the vibration direction X-X of the vibrator unit 12 and provide localization guidance for the vibrator unit 12.

The driving magnet 123 is magnetized along the thickness direction of the vibration unit, the driving coil 16 comes in a flat-ring shape, and is received in the receiving space 100, and is separated from the driving magnet 123. After being powered on, the driving coil 16 will receive Ampere force in the magnetic field generated by the driving magnet 123, receiving the reactive force of this Ampere force, the driving magnet 123 will further push the vibrator unit 12 to make reciprocating movement along the vibration direction X-X of the vibrator unit 12.

The driving magnet 123 includes a fifth magnet 1230, a sixth magnet 1231, and a seventh magnet 1232 which are spaced apart in sequence along the vibration direction X-X of the vibrator unit 12. The fifth magnet 1230 and the seventh magnet 1232 are of the same magnetizing direction, and the sixth magnet 1231 and the seventh magnet 1232 are of the opposite magnetizing directions. The driving coil 16 includes a first driving coil 161 which is assembled on the upper parts of the fifth magnet 1230 and the sixth magnet 1231, and a second driving coil 162 which is assembled on the upper parts of the sixth magnet 1231 and the seventh magnet 1232, therefore, after powered on, the first driving coil 161 will receive Ampere force in the magnetic field generated by the fifth driving magnet 1230 and the sixth magnet 1231, and after being powered on, the second driving coil 162 will receive Ampere force in the magnetic field generated by the sixth driving magnet 1231 and the seventh magnet 1232.

Slots 1203 are respectively set on the weight 120 on both ends of the vibration direction X-X of the vibrator unit 12, the third magnet 121 and the fourth magnet 124 are respectively fixed within the slots 1203. A first through-hole 1200, a second through-hole 1201, and a third through-hole 1202 are respectively set on the positions of the weight 12 which corresponds to the fifth magnet 1230, the sixth magnet 1231, and the seventh magnet 1232 which are used to receive the above three magnets 1230, 1231, and 1232, and go through the weight 12.

The weight 120 depresses and forms a pair of bearing parts 1204 and a pair of ring grooves 1205 encircling the bearing parts 1204. The first and second inner magnets 126, 127 sheathed and fixed in the bearing parts 1204 and received in the ring grooves 1205, respectively. In this way, the outside surface of the first and second inner magnets 126, 127 will not exceed the outer surface of the weight 120.

Figure 5:
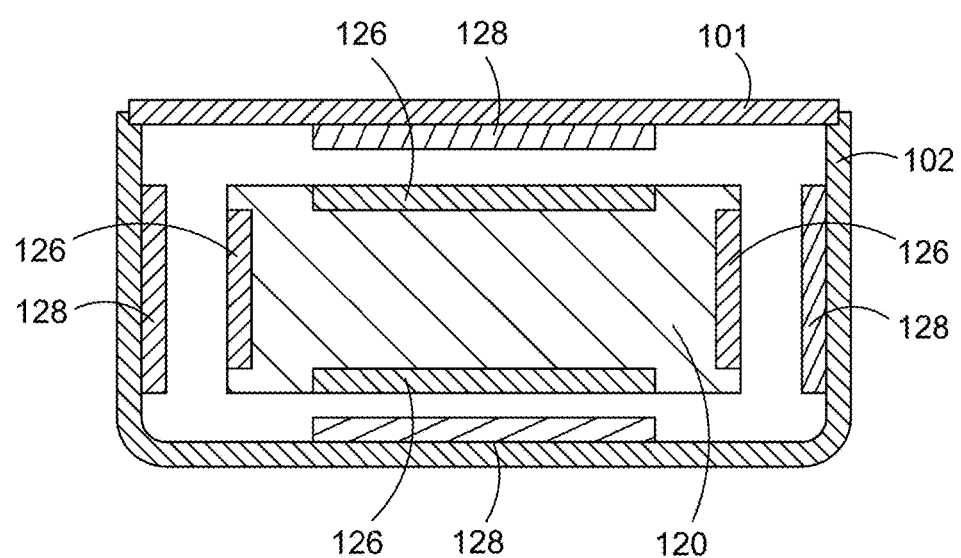
FIG. 5 is an enlarged cross-sectional view of a flat linear vibration motor according to a second exemplary embodiment of the present invention.

A second exemplary embodiment of the present invention is similar to the first exemplary embodiment except that: the first and second inner magnets 126, 127 are not limited to the ring magnets. It can be divided into many pieces of magnets positioned on two sides of the weight along the vibration direction X-X and two sides of the weight along a direction which is perpendicular to the vibration direction X-X respectively to reach the same effect as the ring magnet does. The first and second outer magnets are not limited to the ring magnets. It can be divided into many pieces of magnets affixed in the inner surface of the housing and facing the corresponding inner magnet respectively to reach the same effect as the ring magnet does. Use the inventive concept of the invention and the protection scope required by the invention. Referring to FIG. 5, the first inner magnet 126 is divided into four pieces of magnets attached on four outer sides of the weight 120, and accordingly, the first outer magnet 128 is divided into four pieces of magnets attached on four inner sides of the housing 10. Each of the first inner magnets is spaced apart from the corresponding first outer magnet and a magnetic pole thereof is similar to an adjacent magnetic pole of the first outer magnet.

In order to prevent the weight from meeting the housing to generate undesired noise, the liner vibrator further comprises at least a soft spacer provided between the first inner magnet and the first outer magnet. The soft is made of foam, silicone rubber, or the like.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. A flat linear vibration motor, comprising:
   a housing having an accommodation space;
   a first magnet received in the accommodation space and fixed in the housing;
   a vibrator unit suspended in the housing, the vibrator unit including a weight and, a third magnet, a driving magnet, and a fourth magnet fixed in the weight, respectively, the third magnet being such configured that a magnetic pole thereof is similar to an adjacent magnetic pole of the first magnet;
   a second magnet fixed in the housing, the first magnet, the vibrator unit and the second magnet arranged one by one along a vibration direction of the vibrator unit, the second magnet being such configured that a magnetic pole thereof is similar to an adjacent magnetic pole of the fourth magnet;
   a guiding member provided for enabling the vibrator unit being suspended within the housing, and guiding the vibrator unit moving along the vibration direction, the guiding member having an inner magnet fixed on the vibrator unit and an outer magnet surrounding the inner magnet, separated from the inner magnet and attached on the housing, a magnetic pole of the inner magnet is similar to an adjacent magnetic pole of the outer magnet; and
   a driving coil received in the accommodation space and opposed to the driving magnet; and
   wherein the weight depresses and forms a pair of bearing parts and a pair of ring grooves encircling the bearing parts, the first and second inner magnets sheathed and fixed in the bearing parts and received in the ring grooves, respectively.

2. The flat linear vibration motor as described in claim 1, wherein the housing includes an upper shell and a lower shell cooperating with the upper shell for forming the accommodation space, the lower shell includes a bottom wall and a side wall extending from the bottom wall, the first magnet and the second magnet are fixed respectively on the side wall of the lower shell.

3. The flat linear vibration motor as described in claim 1, wherein the inner magnet having a first inner magnet and a second inner magnet, the driving magnet is positioned between the first and second inner magnets and separated from the first and second inner magnets, the outer magnet comprises a first outer magnet surrounding the first inner magnet and a second outer magnet surrounding the second inner magnet.

4. The flat linear vibration motor as described in claim 1, wherein the inner magnet is a ring magnet.

5. The flat linear vibration motor as described in claim 1, wherein the first and second inner magnets are divided into many pieces of magnets positioned on two sides of the weight along the vibration direction X-X and two sides of the weight along a direction which is perpendicular to the vibration direction X-X respectively.

6. The flat linear vibration motor as described in claim 1, wherein the weight forms two slots at two ends thereof along the vibration direction, the third magnet and the fourth magnet are fixed inside the slots.

7. The flat linear vibration motor as described in claim 1, wherein the driving magnet includes a fifth magnet, a sixth magnet, and a seventh magnet which are spaced apart in sequence along the vibration direction.

8. The flat linear vibration motor as described in claim 7, wherein the fifth magnet and the seventh magnet are of the same magnetizing direction, the sixth magnet and the seventh magnet are of opposite magnetizing directions, the driving coil includes a first driving coil assembled on upper parts of the fifth magnet and the sixth magnet, and a second driving coil assembled on upper parts of the sixth magnet and the seventh magnet.

\* \* \* \* \*